No. 794,684. PATENTED JULY 11, 1905.
D. RUPP.
STEEL TRAP.
APPLICATION FILED SEPT. 12, 1904.
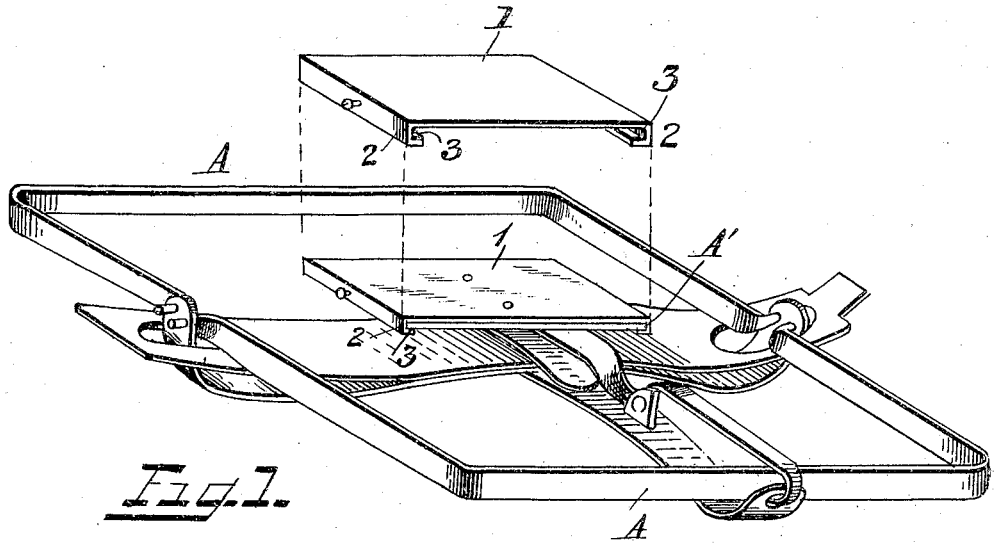
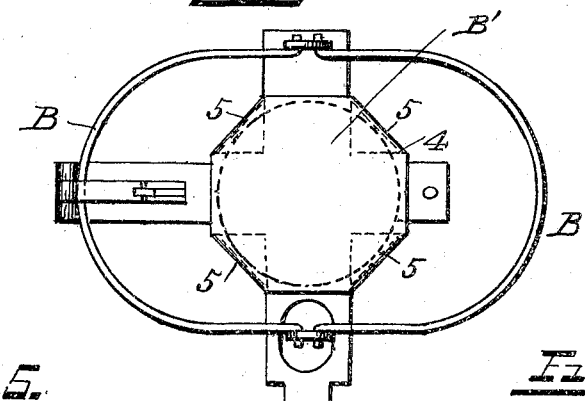
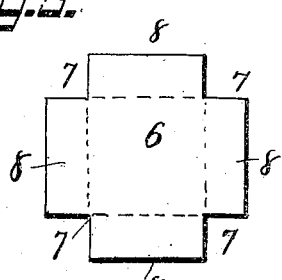
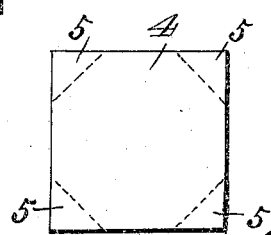
Witnesses
F. L. Ourand.
Milton Tibbits.
Inventor
Daniel Rupp
By C. J. Stockman
Attorney No. 794,684.  
Patented July 11, 1905.

UNITED STATES PATENT OFFICE.

DANIEL RUPP, OF WESTPOINT, NEBRASKA, ASSIGNOR OF ONE-HALF TO JOHN H. LINDALE, OF WESTPOINT, NEBRASKA.

STEEL TRAP.

SPECIFICATION forming part of Letters Patent No. 794,684, dated July 11, 1905.

Application filed September 12, 1904. Serial No. 224,149.

*To all whom it may concern:*

Be it known that I, DANIEL RUPP, a citizen of the United States, residing at Westpoint, in the county of Cuming and State of Nebraska, have invented certain new and useful Improvements in Steel Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in traps for catching minks, beavers, muskrats, and other fur-bearing animals which frequent the water, and which traps comprise a pair of jaws which are held in open or set position by a means which includes a bait-pan, the parts being so related that when said bait-pan is depressed the jaws are sprung together and catch the animal which has caused said depression.

A principal object of the present invention is to provide a baiting means for said traps which will most efficiently attract the animals thereto, may be easily applied to and removed from the trap, may be readily procured or made and at a nominal expense, may be kept an indefinite period of time without deterioration, will not be liable to become detached from the trap at an inopportune time from any cause, and, in short, will overcome all the disadvantages incident to the use of the baiting means now employed in such traps.

To this end the invention consists in a baiting means for such traps comprising a sheet or plate of bright material having lips or flanges adapted to be bent into engagement with the bait pan or treadle of the trap, and, further, consists in a trap of the class described provided with such baiting means.

In the accompanying drawings, illustrating the invention, Figure 1 is a perspective view of a trap having one form of the present baiting means applied thereto. Fig. 2 is a detail view of the baiting means shown in Fig. 1. Fig. 3 illustrates a second form of trap provided with a baiting means constructed in accordance with the present invention. Fig. 4 is a detail view of the baiting means illustrated in Fig. 3, showing in full lines the shape of the same prior to its being bent into engagement with the bait-pan and having dotted thereon the lines upon which it is bent to engage said pan, which pan is shown in dotted outline. Fig. 5 is a detail view of another form of baiting means constructed in accordance with this invention.

The same letters and numerals of reference designate the same parts in the several views.

In the accompanying drawings there are shown two different well-known forms of steel traps, which are merely selected to exemplify the advantages and principle of operation of the present invention, it being understood that this invention is not restricted to the detail construction of either of said traps and contemplates, broadly, in so far as the trap is concerned, any construction thereof adapted to be used under water and embodying a bait pan or treadle which when depressed or moved by a water-frequenting animal causes or permits the jaws to spring together, and thus catch said animal. For the reasons stated it is not necessary to set forth the detail construction of either of said traps. It is sufficient to say that in each of them there is a pair of spring-pressed jaws, (designated A and B in Figs. 1 and 3, respectively,) which are held in open or set position by a means which includes a bait pan or treadle (designated A' and B', respectively, in said figures) and suitable latching or other devices which engage said jaws and prevent closing of the same when the bait pan or treadle is elevated and are released from said jaws to permit the springs to close the latter when the bait pan or treadle is depressed. A principal difference between the two forms of traps is in the shape of the bait pan or treadle, the one, A', in Fig. 1 being square, while the one B' shown in Fig. 3 is round. In the present invention there is applied to said bait pan or treadle A' or B' in lieu of all other bait a surface of bright material, preferably metal, which becomes luminous and magnified when the trap is placed under water and attracts the attention of minks, beavers, muskrats, and other fur-bearing animals which frequent the water, and as said animals are of an exceedingly inquisitive nature it is found in practice that they seek to investigate the cause of that which has attracted their attention and in doing so jump with their fore feet close together full upon the bait pan or treadle, and thus unfailingly cause the trap to be sprung and themselves to be caught thereby.

In the practical construction of the device it is found to be very advantageous to form the surfacing material for the bait pan or treadle separate from the latter and so construct it that it may be readily applied to and removed from the same. Therefore the accompanying drawings show embodiments of the invention differing slightly from each other in details, but each characterized by the fact that it is capable of being readily applied to and removed from any ordinary bait pan or treadle. All of the forms of baiting devices shown in the accompanying drawings are angular in shape and have flexible edges which may be bent to form lips or flanges to engage the edge of the bait pan or treadle. In the form of device shown in Figs. 1 and 2 the baiting means comprises an oblong plate 1, having its opposite edges bent to form approximately L-shaped lips or flanges 2, thus forming recesses 3, which receive the edges of the square bait pan or treadle A', and in the form shown in Figs. 3 and 4 the baiting means 4 is square and is removably secured to the round pan or treadle B' by having its corners bent to form lips or flanges 5, which inclose the peripheral edge of the bait pan or treadle at different places around the latter, while in the form shown in Fig. 5 the baiting means consists of a plate 6, having its corners cut away, as shown at 7, to form outwardly-projecting lips or flanges 8, which are bent to inclose the edge or edges of the round or square bait pan or treadle A' or B'. The edges of the baiting means may be bent at the moment of the application of the same to the bait pan or treadle or prior thereto and in the manufacture of the device, whichever is preferred.

In practice it is found that bright tin forms a very satisfactory material for the baiting means of the present invention, and for this reason and because of its cheapness and availability it is preferred to use the same.

From the above it will be seen that the present invention provides a device which fully accomplishes the objects hereinabove set forth and which because of its advantages over the present means of baiting such traps will readily commend itself to those trappers who are engaged in the business of catching fur-bearing animals which frequent the water.

Having thus described the invention, what is believed to be new, and desired to be secured by Letters Patent, is—

1. A baiting means adapted to the bait pan or treadle of traps of the class described, comprising a surfacing plate or sheet of bright material and having bendable edge portions for securing it to the pan or treadle.

2. A baiting means for the pan or treadle of a trap adapted to catch water-frequenting animals, comprising a bright metallic surfacing-plate having flexible edges adapted to be bent to engage the edge or edges of said bait pan or treadle, substantially as described.

3. A baiting means adapted to the bait pan or treadle of a trap of the class described comprising an angular plate formed of bright metal and having flexible edge portions which are adapted to be bent to form lips which secure said plate to said pan or treadle, substantially as described.

4. A trap for water-frequenting animals comprising a pair of jaws, a pan or treadle for holding said jaws in open position, said pan or treadle having a separately-formed surface of bright material which serves as the bait of the trap, and means for securing said surface removably to said pan or treadle.

5. A trap for water-frequenting animals, comprising a pair of jaws, and a pan or treadle for holding said jaws in open position, said pan or treadle having a bright surfacing material which serves as the bait of the trap and is provided with a flanged edge by which it is secured to said pan or treadle.

6. A trap of the class described, having its bait pan or treadle provided with a surface of bright metal, said surface comprising a plate having a bent lip or flange which engages the edge of said pan or treadle and thereby secures said plate removably thereto, substantially as described.

In testimony whereof I have affixed my signature in presence of two witnesses.

DANIEL RUPP.

Witnesses:
JOHN MEISTER,
G. L. REBHAUSEN.